W. G. SCHNEE.
SEEDER.
APPLICATION FILED MAY 11, 1915.
1,171,546.
Patented Feb. 15, 1916.
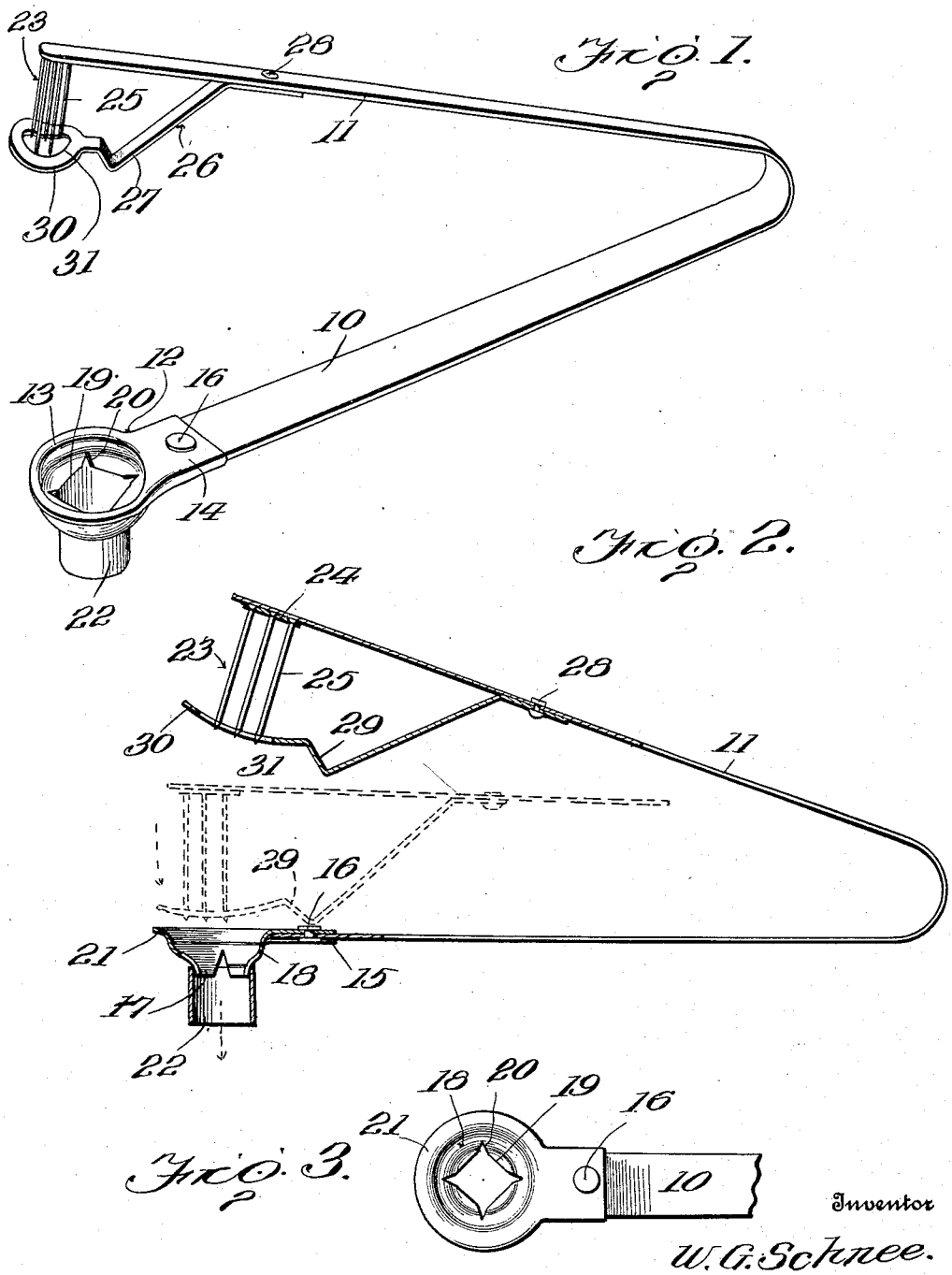
Inventor
W. G. Schnee.
By
Attorneys

UNITED STATES PATENT OFFICE.

WILLIAM G. SCHNEE, OF KANSAS CITY, MISSOURI, ASSIGNOR OF FIFTY-ONE ONE-HUNDREDTHS TO THOMAS J. LETCHWORTH, OF KANSAS CITY, MISSOURI.

SEEDER.

1,171,546. Specification of Letters Patent. Patented Feb. 15, 1916.

Application filed May 11, 1915. Serial No. 27,394.

*To all whom it may concern:*

Be it known that I, WILLIAM G. SCHNEE, a citizen of the United States, residing at Kansas City, in the county of Jackson and State of Missouri, have invented certain new and useful Improvements in Seeders, of which the following is a specification.

This invention contemplates an improved fruit seeder and has as its primary object to provide a device of this character especially adapted for use in seeding cherries or fruits of a similar nature.

The invention has as a further object to provide a device of this character which, in use, will cause minimum injury to the meat of the cherries and which will be adapted to produce a clean break in the meat of each cherry in ejecting the seed therefrom, so that the outer surface of each cherry throughout the greater portion of its area, will be free from abrasion, while the seeded cherries will possess a firm, whole and uniform appearance.

The invention has as a further object to provide a fruit seeder of the above described character, which may be easily operated with one hand, while the other hand may be used to properly feed the cherries to the seeder one at a time.

A further object of the invention, in this connection, is to provide an improved seeder having a seeding element adapted to pierce each cherry for ejecting the seed therefrom, and also having a yieldably mounted ejector adapted to automatically remove the seeded cherry from the said element as it is moved to normal position. And a still further object of the invention is to provide a device of this character which will be exceedingly simple in construction and which will thus provide a highly desirable article of manufacture.

Other and incidental objects will appear as the description proceeds and in the drawings wherein I have illustrated the preferred embodiment of the invention and wherein similar reference characters designate corresponding parts throughout the several views, Figure 1 is a perspective view of my improved seeder, Fig. 2 is a horizontal sectional view more particularly showing the construction of the seeder cup, this view also showing in dotted lines, the manner in which the ejector is adapted to coact with the arms of the seeder, and Fig. 3 is a fragmentary plan view of the seeder cup or socket.

In the preferred embodiment of the invention, as illustrated in the drawings, my improved seeder includes a substantially U-shaped body portion having coacting arms 10 and 11. As shown, the body portion is preferably formed from a length of suitable resilient sheet metal bent into the desired shape, and in this connection, it will be observed that the arm 11 is slightly longer than the arm 10.

Mounted upon the outer extremity of the arm 10 is a cup 12. The body portion 13 of this cup is preferably formed from an annular piece or disk of suitable resilient sheet metal and the said disk upon one side, is provided with an extension 14, opposite side edges of which are bent laterally and toward each other to form flanges 15 embracing the adjacent terminal of the arm 10. Connecting the extension 14 of the arm 10 is a rivet 16 or other suitable fastening device, it being observed that the rivet is provided with a somewhat enlarged circular head.

The body portion of the socket 12 at a point medially thereof, is cut upon intersecting diametric lines to thus release the quadrantly spaced segmental tongues 17 which are bent laterally relative to the plane of the body portion 13 and are transversely curved to provide a substantially frusto-conical socket 18. The transverse curvature of the tongues 17 immediately adjacent the free outer ends thereof is but slight so that the opening defined by said tongues in the bottom of the socket is formed with substantially rectangular straight walls 19. Preferably, the body portion 13 between adjacent tongues 17 and at the inner extremities of said tongues, is formed with a plurality of radial substantially V-shaped notches 20 having their apexes directed toward the periphery of the socket 18 and with the side walls thereof merging into the adjacent straight walls 19 defining the opening in the bottom of the socket.

As best shown in Figs. 1 and 2 of the drawings, the body portion 13 is provided, at the larger end of the socket 18 with a radial flange 21, this construction facilitating the operation of placing the fruit within the cup.

Mounted upon the cup 12 and surrounding the free ends of the tongues 17 is an annular discharge spout 22. The spout 22 is in the nature of a split ring which may be formed from suitable resilient metal similar in character to the metal employed in forming the cup 12, and which is secured to the free ends of the tongues 17 adjacent one end thereof in any suitable manner, as by solder.

Mounted upon the arm 11 adjacent the free end thereof and adapted to coact with the cup 12 is a seeding element 23. The element 23 preferably includes a head 24 in which are embedded a plurality of prongs 25 which extend laterally from the head, the prongs 25 being preferably straight and arranged in substantial parallel relation to each other. As best shown in Fig. 1 of the drawings, five of the prongs are preferably used, four of which are arranged at the corners of a rectangle equal in area to the rectangular opening defined by the walls 19, while the fifth prong is arranged in the center of the field thus defined by said first mentioned prongs.

The head 24 is secured to the adjacent terminal of the arm 11 in any suitable manner and it will be observed that by arranging the prongs 25 in the manner just above described, the four corner prongs will pass through the opening in the bottom of the socket 18 immediately adjacent the notches 20. In use, a cherry is placed within the socket 18 and the arms 10 and 11 are then moved toward each other to cause the prongs 25 of the seeding element 23 to pierce the cherry and force the seed thereof out through the spout 22.

In this connection, it is desired to direct attention to the fact that owing to the presence of the substantially straight rectangular walls 19 defining the opening in the socket 18 and the arrangement of the prongs 25 to coact with the side walls 19 and with the notches 20, the socket 18 will support the cherry in such manner as to produce a clean break in the meat thereof when the prongs of the seeding element enter the cherry to expel the seed thereof. Thus, the seeded cherry will retain to a large degree its original form and will not be mashed or otherwise externally abraded during the seeding operation. This is a particular feature of advantage in the present invention since it permits the fruit to be canned or otherwise preserved in substantially its original shape.

Mounted upon the arm 11 adjacent the free extremity thereof is an ejector 26. As best shown in Fig. 1 of the drawings, the ejector 26 is in the nature of a flat spring, being preferably formed from a single strip of suitable sheet metal and having the shank 27 thereof secured adjacent one end, to the arm 11 in any suitable manner as by a rivet 28. The shank 27 is arranged to project laterally from the arm 11 toward the arm 10 and, adjacent the free extremity thereof, is bent upon itself to provide a shoulder or bearing member 29. From the shoulder 29, the shank is continued laterally in a direction toward the arm 11 and, at its outer terminal, is provided with an enlarged preferably annular head 30 having an opening 31 formed therein and adapted to freely receive the seeding element 23.

The shank 27 of the ejector is adapted to normally maintain the head 30 thereof in a plane passing through the free ends of the prongs 25. It will be noted that when the arms 10 and 11 are moved toward each other, the shoulder 29 is adapted to contact with or engage the head of the rivet 16 which thus provides a striking plate for the ejector, as best shown in dotted lines in Fig. 2 of the drawings.

When the device is operated in use, and the arms 10 and 11 are moved toward each other to cause the seeding element 23 to pierce a cherry within the cup 12, the shoulder 29 of the seeding element will contact with the striking plate formed by the head of the rivet 16 to cause the head 30 of the ejector to be moved longitudinally of the prongs 25 of the seeding element. As will be clear, the meat of the cherry will thus, under ordinary circumstances, lodge or become impaled upon the prongs of the seeding element. Consequently, when the arms 10 and 11 are then subsequently allowed to assume their normal position, the shank 27 of the ejector will move the head 30 thereof longitudinally of the prongs 25 to eject the meat of the cherry from the said prongs. It will be observed that the actuation of the ejector is entirely automatic and that the device may be operated by one hand while the other hand may be employed to position the cherries one at a time within the seeding cup.

It will therefore be seen that I provide a very simple and efficient construction for the purpose set forth which may be cheaply manufactured and which will thus produce a highly desirable commercial article. In this connection, it may be stated that while I have indicated that five of the prongs 25 are preferably employed in forming the seeding element 23, still, I do not wish to be limited to this specific arrangement, since any number of prongs may be used as found best adapted to eject the seed from the particular variety of fruit for which that particular type of seeding element is designed.

Having thus described my invention, what I claim and desire to secure by Letters Patent is:—

1. A device of the character described including a body portion having coacting arms, a cup carried by one of said arms and provided with an opening, a seeding element carried by the other of said arms and adapted for movement to project into the opening of the cup to coact with the cup, and an ejector mounted upon one of said arms and engageable intermediate its length with the other arm for movement relative to the seeding element to coact therewith.

2. A device of the character described including coacting arms, a cup carried by one of said arms and provided with an annular opening provided at a point intermediate its length with substantially rectangular walls, and a seeding element carried by the other of said arms and adapted for movement to project into said opening to coact with the said walls.

3. A device of the character described including coacting arms, a cup carried by one of said arms and provided with an opening having substantially straight rectangular walls, a seeding element carried by the other of said arms and including a plurality of prongs disposed at the corners of a rectangle equal in area to the area of said opening, the said prongs being adapted for movement to project into said opening to coact with the walls thereof, and an ejector arranged to coact with said seeding element.

4. A device of the character described including coacting yieldably supported arms, a cup mounted upon one of said arms, the said cup including a body disk having a plurality of tongues formed therefrom bent to define a substantially frusto conical socket open at its ends, and a spout supported by said tongues, a seeding element carried by the other of said arms and including a head having a plurality of prongs extending therefrom, said prongs being adapted for movement to project into the said socket to coact therewith, and an ejector carried by one of said arms and adapted to coact with the seeding element, said ejector including a yieldable shank, and a head embracing the seeding element and adapted for movement longitudinally thereof, the head of said ejector being normally disposed in a plane passing through the prongs of the seeding element adjacent the free ends thereof and the said seeding element being adapted to engage the other of said arms whereby the head will be moved longitudinally of the said prongs as the prongs are moved into coacting relation within the socket.

5. A device of the character described including coacting arms, a cup carried by one of said arms and provided with a longitudinally tapered opening having angularly disposed walls projecting therein, and a seeding element carried by the other of said arms and adapted for movement to project into said opening to coact with said walls.

6. A device of the character described including coacting arms, a cup carried by one of said arms and provided with a frusto-conical opening having angularly disposed walls projecting into the smaller extremity thereof, and a seeding element carried by the other of said arms and adapted for movement to project into said opening to coact with said walls.

7. A device of the character described including coacting arms, a cup carried by one of said arms and provided with an opening having notches leading therefrom, and a seeding element carried by the other of said arms and provided with prongs adapted for movement into said opening to coact with said notches.

8. A device of the character described including coacting arms, a cup carried by one of said arms and provided with an opening having angularly disposed walls projecting therein, there being notches formed in the cup opening through the said walls, and a seeding element carried by the other of said arms and provided with prongs adapted for movement into the cup to coact with said walls with certain of the prongs disposed in said notches.

9. A device of the character described including coacting arms, a cup carried by one of said arms and provided with an opening, spaced tongues carried by the cup, and a seeding element carried by the other of said arms and provided with prongs movable into the opening of the cup with the said prongs engaging between said tongues.

10. A device of the character described including coacting arms, a cup carried by one of said arms, a seeding element carried by the other arm and adapted for movement to coact with the cup, a yieldable ejector carried by one of said arms and adapted to coact with the seeding element, and an ejector carried by one of said arms and adapted to engage the other arm to move the ejector relative to the seeding element to coact therewith in advance of the cup.

11. A device of the character described including coacting arms, a cup carried by one of said arms, an ejector carried by the other arm and adapted to coact with the cup, and an ejector carried by one of said arms and provided with a shoulder adapted to engage the other arm for moving the ejector relative to the seeding element to coact therewith in advance of the cup.

12. A device of the character described including coacting arms, a cup carried by one of said arms, a seeding element carried by the other arm and adapted to coact with the cup, and a yieldable ejector having a shank projecting between the arms and a head adapted to coact with the seeding element, the said shank being adapted to engage one of said arms for moving the head relative to the seeding element in advance of the cup.

In testimony whereof I affix my signature in presence of two witnesses.

WILLIAM G. SCHNEE. [L. S.]

Witnesses:
A. E. BERRY,
A. A. KENNEDY.

Copies of this patent may be obtained for five cents each, by addressing the "Commissioner of Patents, Washington, D. C."